(12) United States Patent
Furukawa (10) Patent No.: US 6,709,063 B1
(45) Date of Patent: Mar. 23, 2004

(54) AUTOMOBILE SEAT BELT STRUCTURE AND ASSIST APPARATUS THEREOF

(76) Inventor: Keiji Furukawa, G-7E Tukimigaoka-Mansion 2-5 Houou-Cho Chikusa-Ku, Nagoya-Shi Aichi-Ken (JP)

( * ) Notice: Subject to any disclaimer, the term of this patent is extended or adjusted under 35 U.S.C. 154(b) by 0 days.

(21) Appl. No.: 09/594,044

(22) Filed: Jun. 15, 2000

(51) Int. Cl.$^7$ ................................................. A47C 31/00
(52) U.S. Cl. ..................... 297/488; 297/216.1; 297/483
(58) Field of Search ................................ 297/487, 488, 297/464, 216.1, 483

(56) References Cited

U.S. PATENT DOCUMENTS

| | | | |
|---|---|---|---|
| 3,453,026 A | * | 7/1969 | Paes et al. |
| 3,722,951 A | * | 3/1973 | Ezquerra |
| 3,836,168 A | * | 9/1974 | Nonaka et al. |
| 3,899,024 A | * | 8/1975 | Bonar |
| 5,286,091 A | * | 2/1994 | Busch |
| 6,050,635 A | * | 4/2000 | Pajon et al. |

* cited by examiner

Primary Examiner—Milton Nelson, Jr.
(74) Attorney, Agent, or Firm—Dickstein Shapiro Morin & Oshinsky LLP (57) ABSTRACT

The device provides an automobile seat belt structure and an assist apparatus thereof which can provide a comfortable drive environment by restraining nothing of a chest of an occupant by a seat belt, remove a pressure feeling of the chest for an occupant having a disease in the chest, an occupant having a hypertension, a headache or a retch and the like, and can secure safety with respect to various body types such as a physical build of the occupant, a child and a tall figure, a fatness and the like. Further, the invention provides an automobile seat belt structure and an assist apparatus thereof which can completely prevent a so-called submarine phenomenon that an occupant slides out from a lower area of a belt and strongly collides with a dash board or the like, when an accident is generated. In order to achieve the object mentioned above, the device provides an automobile seat belt structure and an assist apparatus thereof, wherein a seat belt portion is attached in a state of keeping a tension without being in contact with a body of an occupant, and a prevention device for preventing a so-called submarine phenomenon that the occupant slides out from a lower area of the belt when an accident is generate is provided in the belt portion.

9 Claims, 8 Drawing Sheets

AUTOMOBILE SEAT BELT STRUCTURE AND ASSIST APPARATUS THEREOF

BACKGROUND OF THE INVENTION

1. Field of the Invention

The present invention relates to an automobile seat belt structure and an assist apparatus thereof.

2. Description of the Prior Art

A conventionally provided three-point seat belt is basically structured such that a belt is attached to a body of an occupant in a contact state, and a waist belt applied only to a waist portion mainly for protecting a lower half of a body of the occupant and a shoulder belt tucked up the occupant's sleeves from a shoulder portion to the chest and the waist of the occupant are combined. However, there are the following disadvantages.

Since both of the waist belt and the shoulder belt are attached with maintaining a state of being in contact with the body of the occupant, a freedom of the occupant's body is restricted by these belts at a time of a normal drive, so that there is a problem in view of a driving environment.

In particular, in the case of an occupant having a disease in the chest, an occupant having diseases of adult people such as a hypertension, a cardiac disease, an apoplexy and the like popular for people equal to or more than forty years old or the people having a little symptoms such as pain squeezing the chest, a headache, a retch and the like, a close attachment of the shoulder belt to the body applies a pressure similar to a squeeze to the occupant, so that a severe environment is forced to the occupant.

Further, in accordance with the basic structure mentioned above, since the shoulder belt is positioned on the shoulder of the occupant, the shoulder belt moves apart from the body of the occupant when slightly moving the seat to a reclining state, so that nothing holds a portion under the armpit. Accordingly, when an accident is generated, a so-called submarine phenomenon, that is, the matter that the occupant slips out from a lower area of the belt is caused. Further, even when the seat is at a regular position, the occupant can slide out from an upper area and a lower area of the shoulder belt without drawing the shoulder belt. That is, the shoulder belt is equipment for the purpose of restricting a forward movement of the occupant due to an inertia, and is not equipment for preventing the body from moving in a vertical direction, so that the shoulder belt is not structured such as to correspond to a submarine phenomenon. Further, as an example of the accident cases, when the body is swung in a direction opposite to the shoulder belt side due to a centrifugal force, the belt moves apart from the body of the occupant in the same manner as the case of moving the seat in the reclining state and the occupant slides out to the lower area.

Further, in the basic structure of the conventional seat belt, the belt is detachably engaged with a buckle member, however, a disengaging method is generally constituted by pressing a button provided in the buckle member.

As mentioned above, in order to cancel an engagement, it is unavoidable to always press a significantly limited portion by a finger of the occupant. However, when the accident is generated, the occupant falls into a panic state, so that the occupant can not easily perform even such a motion and it becomes delayed to escape from the vehicle by his or her own ability. In this case, in a state that the belt is not tensioned but loosened or locked, it is necessary to pull out the belt from the buckle while pushing the button and manually take out the belt suspended on the shoulder, so that troublesomeness is increased.

Here, an inherent object of the seat belt is to prevent a head portion and a body of the occupant from crashing into a hard object within the vehicle such as a steering wheel, side door glasses, a front glass and the like at a time when the accident is generated, and not to restrain a motion of the body at a time of driving. Accordingly, within a range that the head portion and the chest are not brought into contact with the steering wheel, the side door glasses, the front glass and the like when the accident is generated, no damage is applied to the occupant even in the structure in which a movable range is not limited. In other words, it is important how a fixing and a restraining of the body are reduced at the normal drive.

Further, since the steering wheel does not exist in a so-called assistant driver's seat not in a driver's seat, it is impossible to hold an attitude by using arms which can be performed by the driver. In particular, since a space between the seat and a dashboard is significantly wide for a child, there is a lack of a reliable feeling at the normal drive, and an impact of the collision is increased when the accident is generated.

SUMMARY OF THE INVENTION

The present invention is made by taking the problems mentioned above into consideration, and an object of the present invention is to provide an automobile seat belt structure and an assist apparatus thereof which can provide a comfortable drive environment by restraining nothing of a chest of an occupant by a seat belt, remove a pressure feeling of the chest for an occupant having a disease in the chest, an occupant having a hypertension, a headache or a retch and the like, and can secure safety with respect to various body types such as a physical build of the occupant, a child and a tall figure, a fatness and the like.

Further, there is provided an automobile seat belt structure and an assist apparatus thereof which can completely prevent a so-called submarine phenomenon that an occupant slides out from a lower area of a belt and strongly collides with a dash board or the like, when an accident is generated.

Further, there is provided an automobile seat belt structure and an assist apparatus thereof in which a belt is easily disengaged, whereby an occupant can smoothly escape out of the vehicle.

Further, there is provided an automobile seat belt structure and an assist apparatus which can sufficiently secure a comfortable drive environment of an occupant in an assistant driver's seat, particularly a child, and a safety when an accident is generated.

In accordance with the present invention, in order to achieve the object mentioned above, there is provided an automobile seat belt structure and an assist apparatus thereof, wherein a seat belt portion is attached in a state of keeping a tension without being in contact with a body of an occupant, and prevention means for preventing a so-called submarine phenomenon that the occupant slides out from a lower area of the belt when an accident is generated is provided in the belt portion.

Further, there is provided an automobile seat belt structure and an assist apparatus thereof, wherein a seat belt portion is attached in a state of keeping a tension without being in contact with a body of an occupant, and there is employed means characterized in that a submarine corresponding cushion (1) bonded to a horizontal supporting column portion (Y) connected to a seat body (Z) side surface is drawn forward in accordance with a force by which the belt portion (B) is drawn forward the vehicle due to an inertia when the accident is generated, the cushion (1) is bent to a front face of the body of the occupant around a hinge (2) corresponding to a center line and the submarine corresponding cushion covers between the armpit and the chest, as prevention means for preventing the occupant from sliding out from a lower area of the belt when an accident is generate.

Further, there is provided an automobile seat belt structure and an assist apparatus thereof, wherein a seat belt portion is attached in a state of keeping a tension without being in contact with a body of an occupant, a cushion (1) simply fixed via a horizontal support column (Y) and a magnet disposed in a side portion of a seat body (Z) is provided in one end of the belt (B), as prevention means for preventing the occupant from sliding out from a lower area of the belt when an accident is generate, and there is employed means characterized in that an attraction state of the magnet in the cushion (1) is cancelled together with a force by which the belt portion (B) is drawn forward the vehicle due to an inertia when the accident is generated, a bonding angle between the horizontal support column (Y) disposed in the side portion of the seat body (Z) and the cushion (1) is changed, and the cushion (1) is driven from the side of the armpit to the below of the armpit and the above of the waist, due to an operation of the hinge (2).

Further, there is provided an automobile seat belt structure and an assist apparatus thereof, wherein a seat belt portion is attached in a state of keeping a tension without being in contact with a body of an occupant, and there is employed means characterized in that a flexible elastic material (3) is mounted to a belt portion (B) and the flexible elastic material (3) expands so as to form a spherical shape or the like together with a force by which the belt portion is drawn forward the vehicle due to an inertia when the accident is generated, as prevention means for preventing the occupant from sliding out,from a lower area of the belt when an accident is generated.

Further, there is provided an automobile seat belt structure and an assist apparatus thereof, wherein a seat belt portion is attached in a state of keeping a tension without being in contact with a body of an occupant, and there is employed means characterized in that an auxiliary air bag is mounted to a belt portion or a belt latch portion and the auxiliary air bag is expanded together with a force by which the belt portion is drawn forward the vehicle due to an inertia when the accident is generated or a direct impact applied to the belt portion by the air bag previously provided within an automobile, as prevention means for preventing the occupant from sliding out, from a lower area of the belt when an accident is generated.

Further, there is provided an automobile seat belt structure and an assist apparatus thereof as recited in a first aspect to a fifth aspect, wherein fixing positions of right and left supporting columns of a seat body in the seat belt portion can be freely adjusted and the fixing position can be adjusted in correspondence to a body condition of the occupant.

Further, there is provided an automobile seat belt structure and an assist apparatus thereof as recited in a first aspect to a sixth aspect, wherein in order to easily disengage the seat belt when the accident is generated, a belt latch portion and a latch-receiving portion attached by an electric magnet is structured such that an engine rotation is stopped due to an accident, whereby a power generating function is stopped, an energizing to the electric magnet is stopped in interlocking with the stop of the power generating function and the magnetic function is automatically lost.

Further, there is provided an automobile seat belt structure and an assist apparatus thereof as recited in a first aspect to a seventh aspect, wherein there is employed means characterized in that a suitably expanded flexible material such as an air bag or the like is mounted to the seat belt portion in a so-called assistant driver's seat so as to reduce a gap between the occupant and a dash board portion at a normal time and utilize as a body stabilizing and holding device and the flexible material moves and deforms in interlocking with a motion of the belt portion so as to stabilize a head portion and a body in the case that the body moves due to an inertia or a centrifugal force when the accident is generated.

In accordance with the present invention, since the seat belt is attached with keeping a tension state without being in contact with a body of an occupant, there is not any restraining such as fastening the body of the occupant, it is possible to provide a comfortable drive environment, and in particular, for an occupant having a disease in the chest and an occupant having diseases of adult people such as a hypertension, an apoplexy and the like, it is possible to remove a pressure by the shoulder belt which is conventionally applied.

Further, in accordance with the present invention, since the submarine corresponding cushion is provided in the seat belt portion, it is possible to prevent a so-called submarine phenomenon that the occupant slides out from the lower area of the belt when the accident is generated.

Further, since the submarine corresponding cushion is structured such that the submarine corresponding cushion is bent upward and positioned in the lower portion of the body of the occupant, a drive interference rate is significantly low without being in contact with the body of the occupant and it is possible to provide an environment for concentrating to a safety drive without interfering a steering wheel and drive operation requiring a quick motion at an emergency and a drive operation requiring a body quick adjusting function such as maintaining a parallel balance of the body or the like at a time of traveling on a rough road.

Further, in accordance with the present invention, since the flexible elastic material expanding so as to form a spherical shape or the like when the accident is generated is provided in the seat belt portion, it is possible to prevent a so-called submarine phenomenon that the occupant slides out from the lower area of the belt when the accident is generated.

Further, in accordance with the present invention, since the fixing position in the seat belt portion can be freely adjusted, it is possible to sufficiently secure the safety of the occupant without relation to the physical build of the occupant, particularly even when the occupant is a child.

Further, in accordance with the present invention, since the flexible material such as the air bag or the like is mounted to the seat belt portion in the assistant driver's seat, it is possible to reduce the gap between the occupant and the dash board portion at the normal time and it is possible to utilize the seat belt structure as the body stabilizing and restraining device, so that it is possible to sufficiently secure the comfortable drive environment of the occupant, particularly the child in the assistant driver's seat and the safety when the accident is generated.

DESCRIPTION OF THE PREFERRED EMBODIMENT

A description will be given below of an embodiment in accordance with the present invention with reference to the accompanying drawings.

A seat belt portion (B) in the present invention is basically structured such as to secure a state of keeping a fixed tension without being in contact with a body of an occupant, that is, not to restrain the body of the occupant. In accordance with the structure mentioned above, at a normal drive time, the occupant is not applied a pressure to a chest thereof, it is possible to avoid the problems in the conventional three-point belt and more particularly it is possible to remove the pressure feeling applied by the shoulder belt, for an occupant having a disease in the chest, an occupant having diseases of adult people such as a hypertension, a cardiac disease, an apoplexy and the like popular for people equal to or more than forty years old or an occupant having a chest pain, a headache, a retch and the like.

Figure 1:
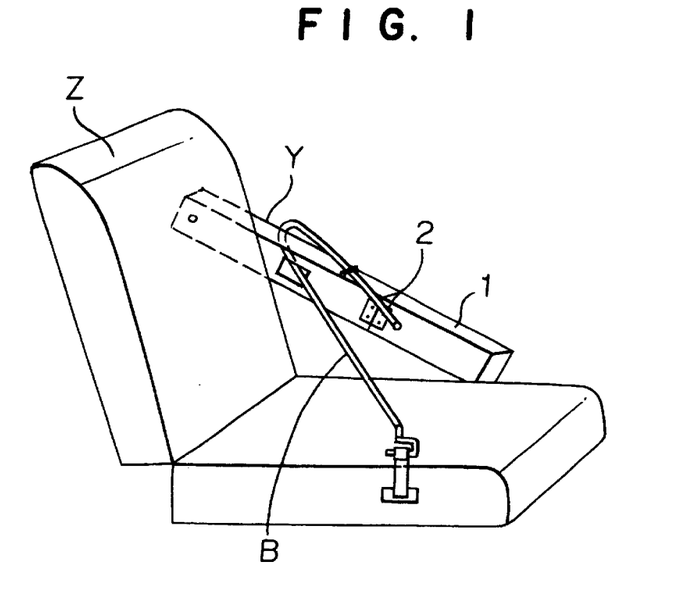
FIG. 1 is a perspective view showing a normal state in an embodiment in accordance with the present invention.

In this case, the seat belt portion (B) is structured, for example, as shown in FIG. 1 and the like, such that a horizontal supporting column (Y) provided on a side surface of a seat body (Z) is bonded to a submarine corresponding cushion (1), and these elements are mounted to one end of the belt (B), obliquely positioned in front of the body of the occupant and engaged with a latch (9,10) near a waist portion.

Figure 15:
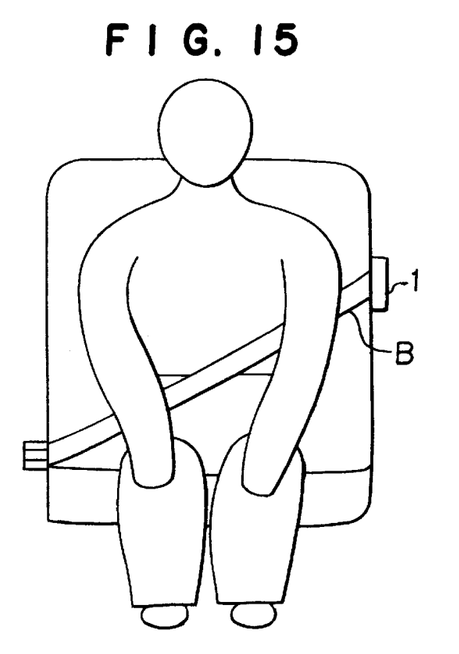
FIG. 15 is a view showing a normal state in a riding condition in an embodiment in accordance with the present invention.
Figure 16:
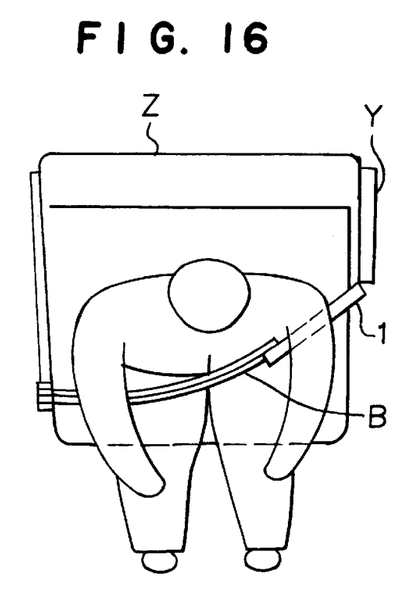
FIG. 16 is a view showing a state that an accident is generated in a riding condition in an embodiment in accordance with the present invention.
Figure 17:
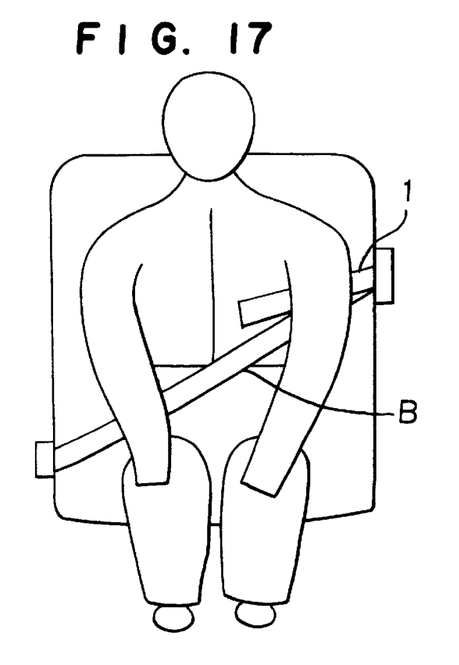
FIG. 17 is a view showing a state that an accident is generated in a riding condition in an embodiment in accordance with the present invention.
Figure 18:
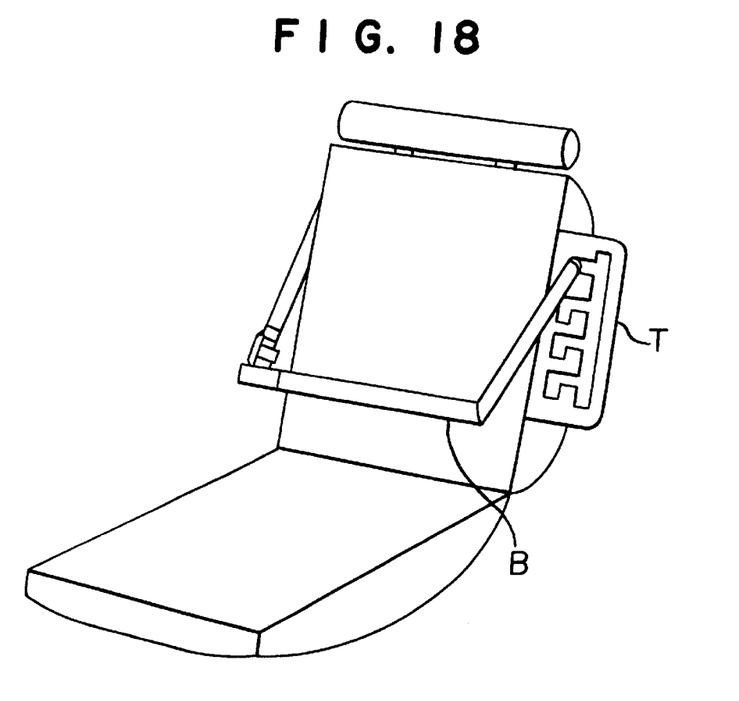
FIG. 18 is a perspective view showing an embodiment in accordance with the present invention.
Figure 19:
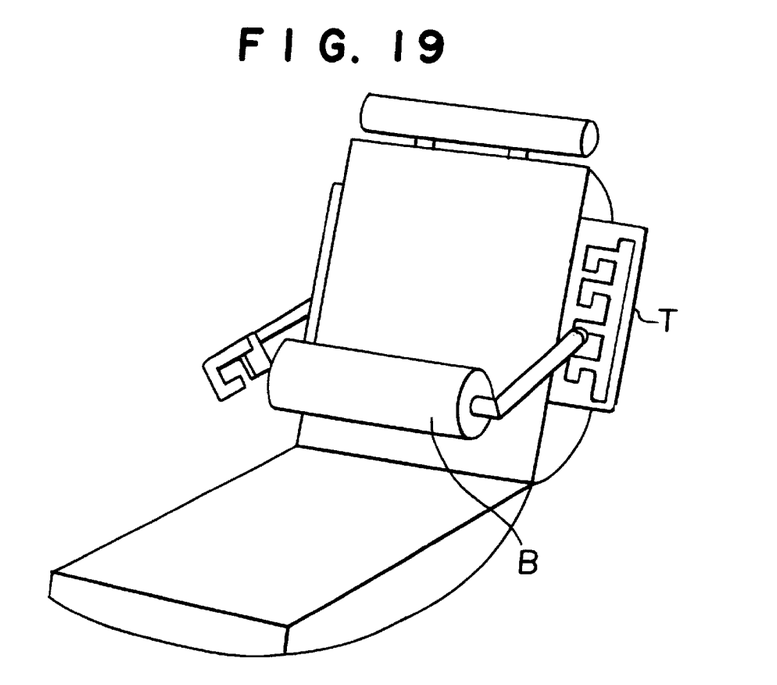
FIG. 19 is a perspective view showing an embodiment in accordance with the present invention.

In this case, the structure in which the seat belt portion (B) is not brought into contact with the body of the occupant is not limited to the aspect mentioned above, and the belt portion (B) can be positioned by various ways, for example, there can be considered aspects as shown in FIGS. 15 and 16.

Various kinds of corresponding cushion mechanism is provided at one end of the belt portion (B) for preventing a so-called submarine phenomenon that the occupant slides out from a lower area of the belt when an accident is generated.

Since the present invention employs the basic structure in which the seat belt portion (B) is not in contact with the body of the occupant as mentioned above, it is possible that the submarine phenomenon is invited in accordance with the positioning of the belt portion, so that a submarine corresponding mechanism is provided in each of the structures for achieving an object of the seat belt, that is, securing a safety of the occupant.

FIGS. 1 to 6 are perspective view which show an embodiment of a particular structure of a submarine corresponding cushion (1) in accordance with the present invention.

As mentioned above, a horizontal supporting column (Y) to which the submarine corresponding cushion (1) is connected is provided in the seat body (Z).

The horizontal supporting column (Y) and the submarine corresponding cushion (1) are connected via a hinge (2) as illustrated, and there can be employed a structure in which end surfaces of the horizontal supporting column (Y) and the submarine corresponding cushion (1) are connected by a simple magnet as stated in claim 3.

Figure 2:
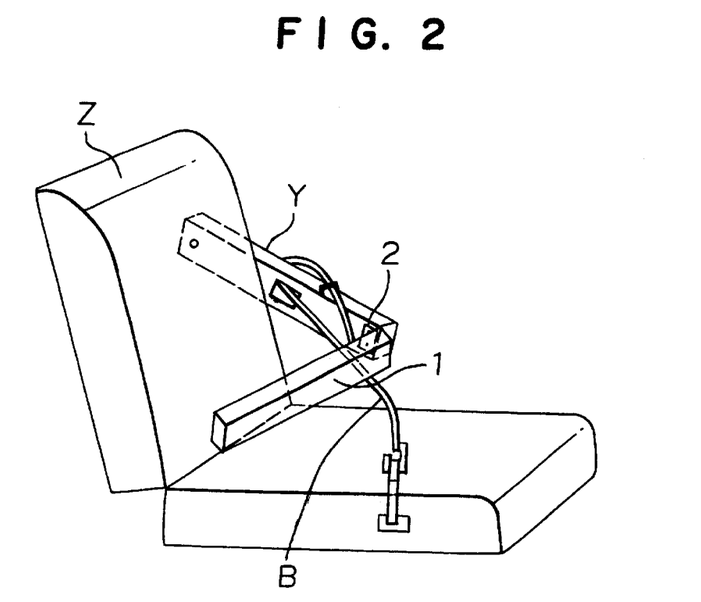
FIG. 2 is a perspective view showing a state that an accident is generated in an embodiment in accordance with the present invention.
Figure 4:
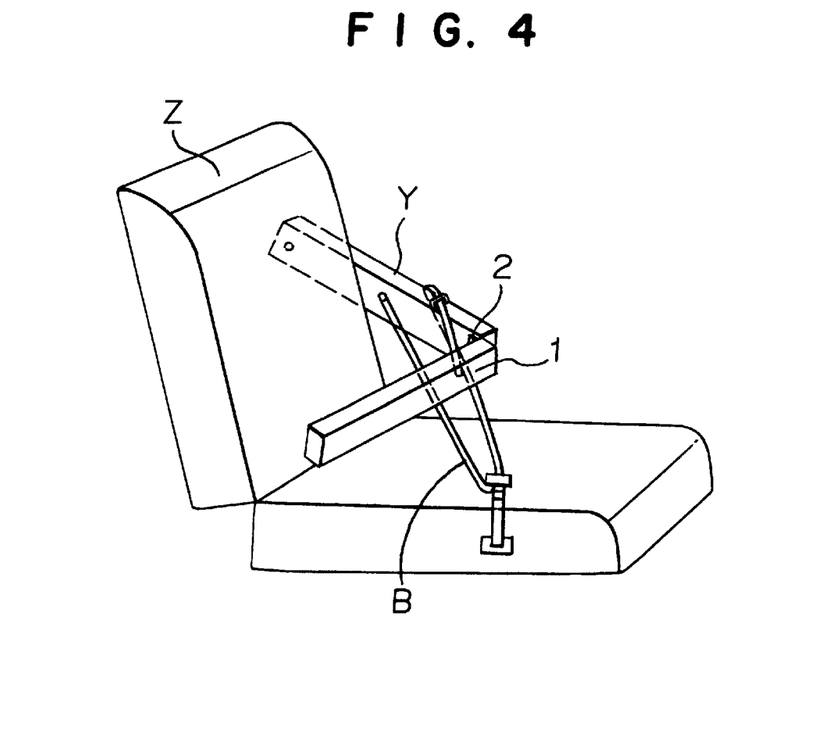
FIG. 4 is a perspective view showing a state that an accident is generated in an embodiment in accordance with the present invention.
Figure 6:
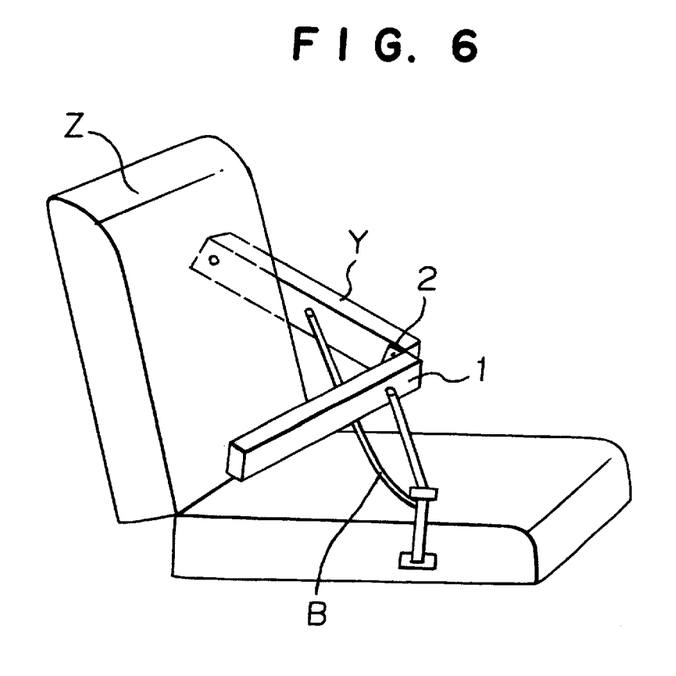
FIG. 6 is a perspective view showing a state that an accident is generated in an embodiment in accordance with the present invention.

As shown in FIGS. 2, 4 and 6, since the cushion (1) is bent toward the occupant via the hinge (2) with respect to the horizontal supporting column (Y) due to a force by which the belt portion is drawn forward a vehicle when an accident is generated, it is possible to prevent the occupant from sliding out from the lower area of the belt.

A particular operation process employs means characterized in that a submarine corresponding cushion (1) bonded to a horizontal supporting column (Y) portion provided on a seat body (Z) side surface is drawn forward in accordance with a force by which the belt portion (B) is drawn forward the vehicle due to an inertia when the accident is generated, the cushion (1) is bent to a front face of the body of the occupant around a hinge (2) corresponding to a center line and the submarine corresponding cushion (1) covers between the armpit and the chest, as prevention means for preventing the occupant from sliding out from a lower area of the belt when an accident is generate, and means characterized in that an attraction state of the magnet in the cushion (1) is cancelled together with a force by which the belt portion (B) is drawn forward in the vehicle due to an inertia when the accident is generated, a bonding angle between the horizontal support column disposed in the side portion of the seat body and the cushion is changed, and the cushion is driven from the side of the armpit to the below of the armpit and the above of the waist.

Figure 3:
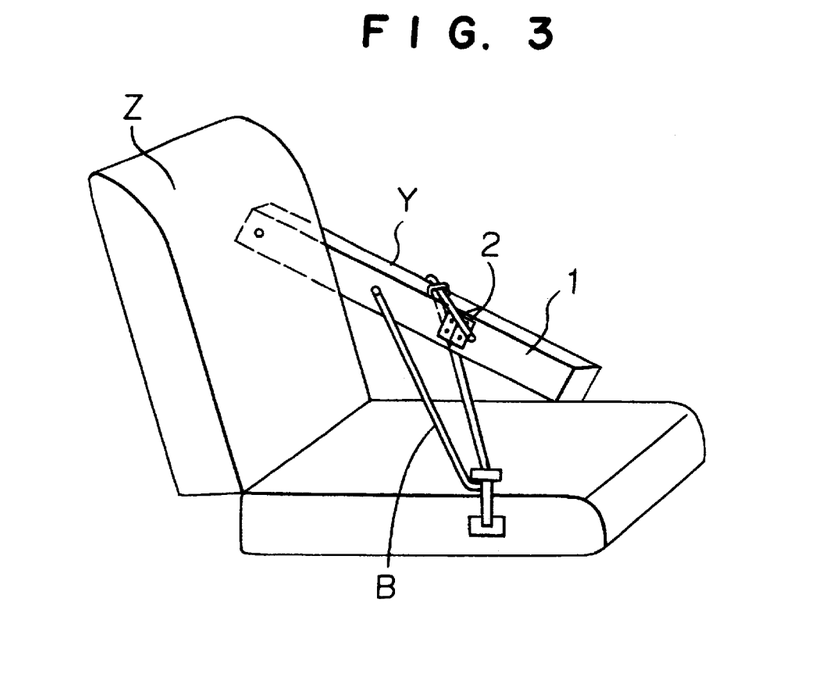
FIG. 3 is a perspective view showing a normal state in an embodiment in accordance with the present invention.
Figure 5:
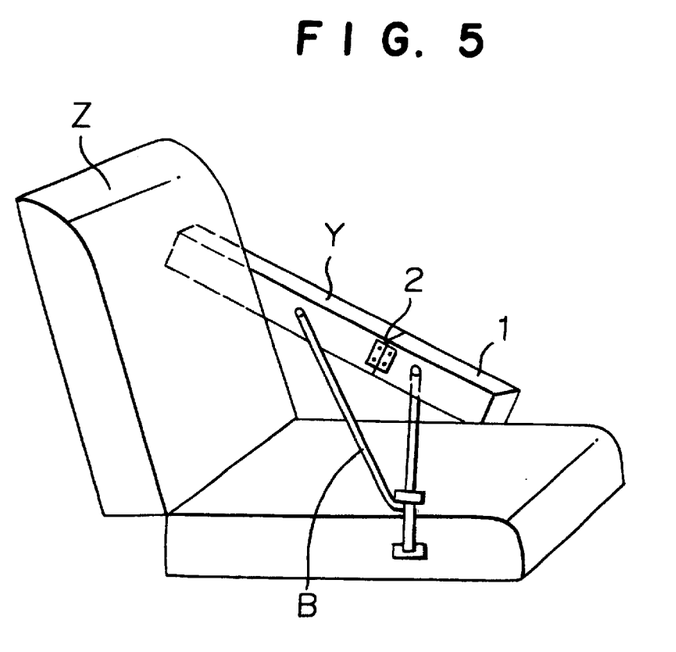
FIG. 5 is a perspective view showing a normal state in an embodiment in accordance with the present invention.

In this case, as shown in FIGS. 1, 3 and 5, since the submarine corresponding cushion (1) is positioned in a state of standing in a forward direction together with the horizontal supporting column (Y) at the normal time, the drive operation is not prevented.

Figure 7:
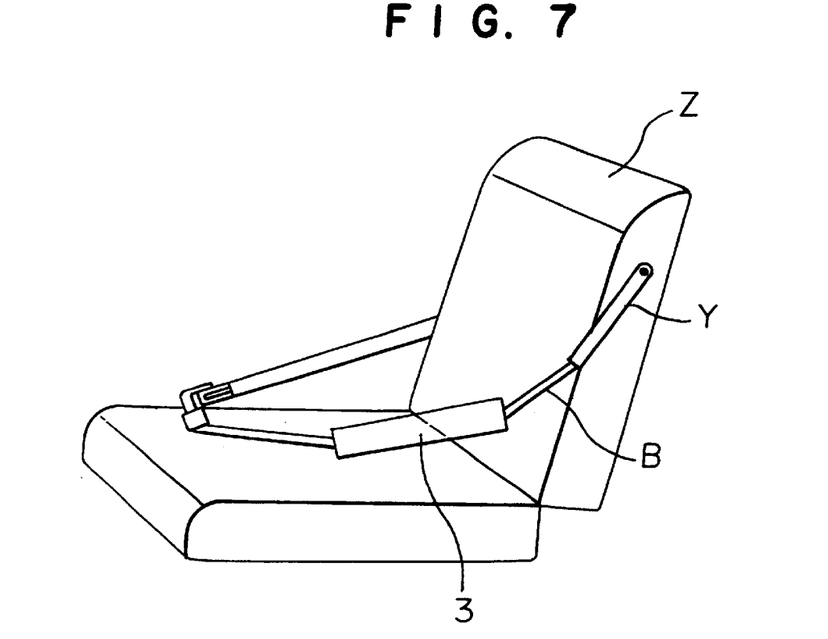
FIG. 7 is a perspective view showing a normal state in an embodiment in accordance with the present invention.
Figure 8:
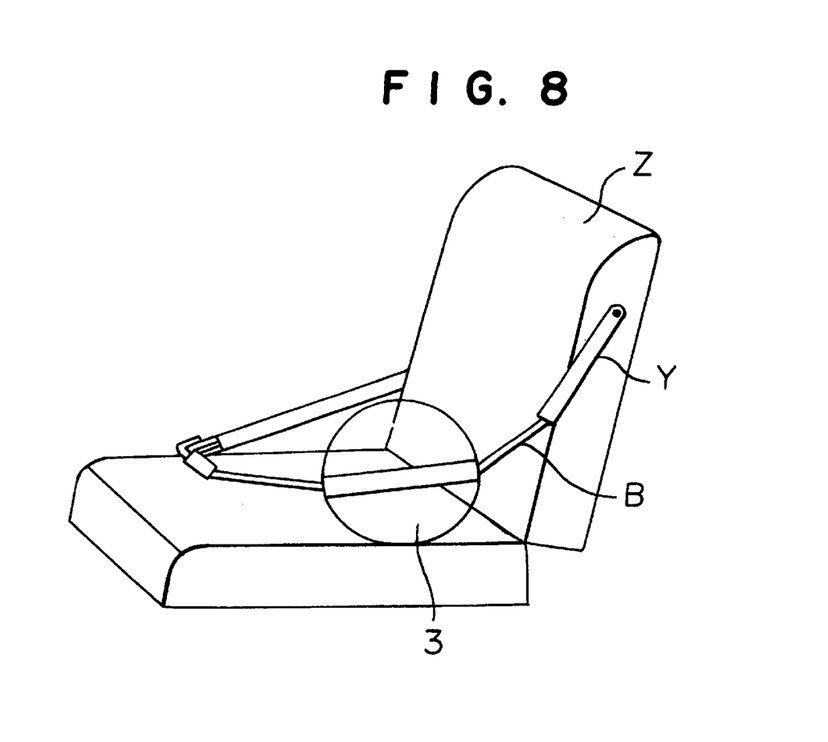
FIG. 8 is a perspective view showing a state that an accident is generated in an embodiment in accordance with the present invention.

As shown in FIG. 8, the cushion (3) made of a flexible material, provided in the seat belt and formed in a spherical shape or the like is, for example, as shown in FIG. 7, provided in the belt portion (B) and substantially formed in a web shape at the normal time, however, is expanded in a vertical direction with respect to the belt when the accident is generated.

In this case, the expanding operation of the flexible elastic material (3) can, for example, employ expanding means for expanding outward in a spherical shape or the like by a compression of a volume of a receiving portion for the material by the belt portion having the material there within being pressed due to a pressure generated by a forward inertia when the accident is generated.

Further, the auxiliary air bag provided in the seat belt or the belt latch portion can, for example, employ a structure provided in the belt portion at the normal time and substantially formed in a web shape in the same manner as the submarine corresponding cushion made of the flexible elastic material shown in FIG. 7, however, expanding when the accident is generated.

The auxiliary bag is structured such as to expand in accordance with a force by which the belt portion is drawn forward the vehicle due to an inertia when the accident is generated or a direct impact applied to the belt portion by an air bag previously provided within the automobile, however, means employed in the conventional automobile air bag is selected to a control mechanism for an expansion starting pressure or the like.

In this case, the auxiliary air bag can, as stated in claim 4, employ a structure expanding in accordance with an impact when the air bag previously provided in the main body is actuated at the accident time, however, even in the case that the main body air bag is prior actuated at that time, the auxiliary bag expands in the lower portion of the main body air bag, so that the main body air bag restrict the upper half body and the auxiliary air bag restricts the side and the waist portion, whereby an inherent function is not lost.

An air bag expanded to a fixed level is provided in the seat belt for the assistant driver's seat, the flexible elastic material completely expands in the same manner as that of the flexible elastic material mentioned above when the accident is generated, thereby preventing the submarine phenomenon of the occupant and can serve as a body stabilizing device by applying a hand thereto or the like, in the same manner as the steering wheel in the driver's seat, at the normal drive state. Further, for a child, a space of the assistant driver is seat is significantly wide in view of the body condition thereof, so that a complete protection can not be achieved only by a safety countermeasure such as the normal air bag or the like. These problems exist in a child seat, in particular, a strong damage is applied to a child having an undeveloped cervical framework due to inertia when the accident is generated. Accordingly, the flexible elastic material such as the air bag expanded to a fixed level or the like at the normal state is provided as the seat belt structure and the assist apparatus thereof in accordance with the present invention, whereby it is possible to narrow the space unnecessarily formed with respect to the occupant.

Figure 9:
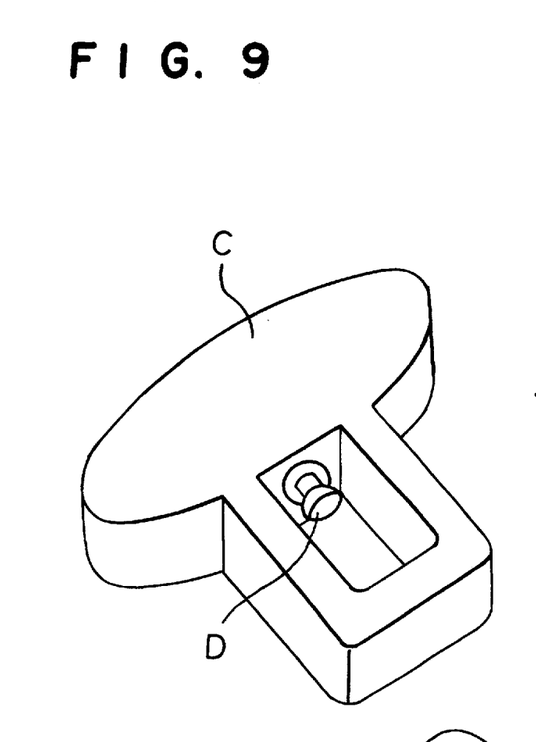
FIG. 9 is a perspective view showing a belt latch-receiving portion in an embodiment in accordance with the present invention.
Figure 10:
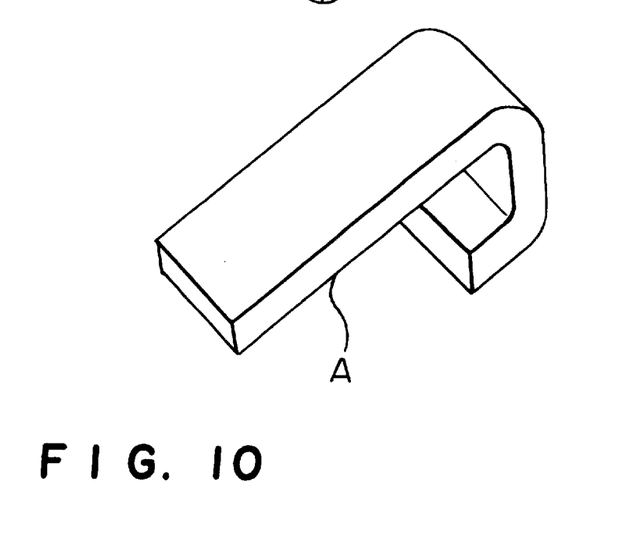
FIG. 10 is a perspective view showing a belt latch portion in an embodiment in accordance with the present invention.
Figure 11:
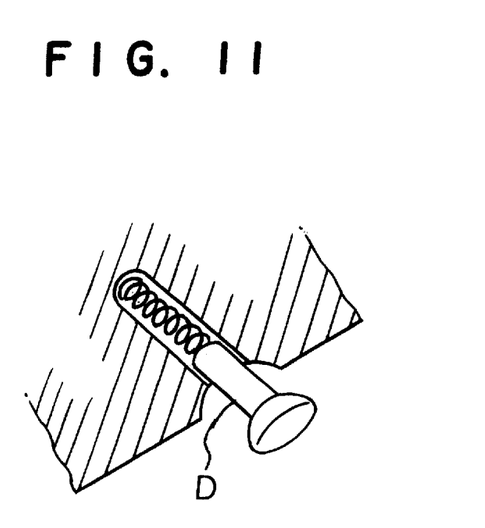
FIG. 11 is a perspective view showing a belt latch detachment prevention portion in an embodiment in accordance with the present invention.
Figure 12:
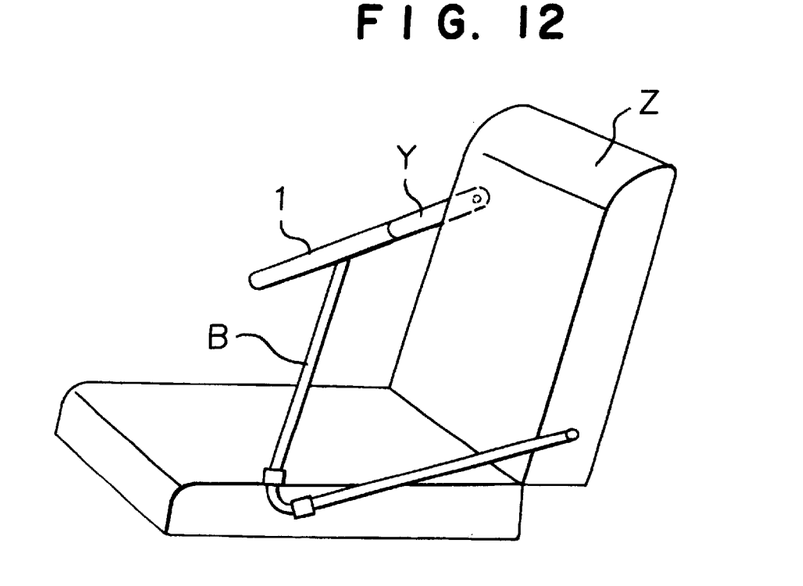
FIG. 12 is a perspective view showing an embodiment in accordance with the present invention.
Figure 13:
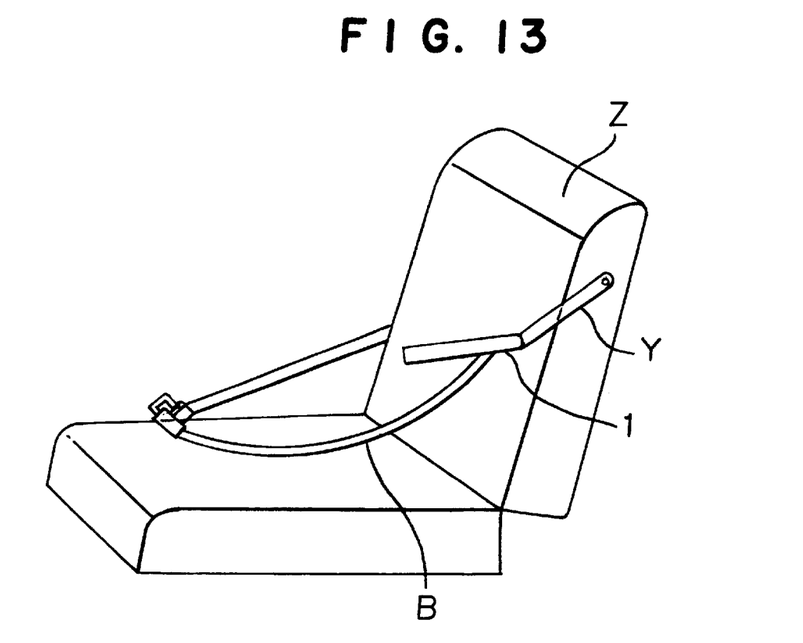
FIG. 13 is a perspective view showing an embodiment in accordance with the present invention.
Figure 14:
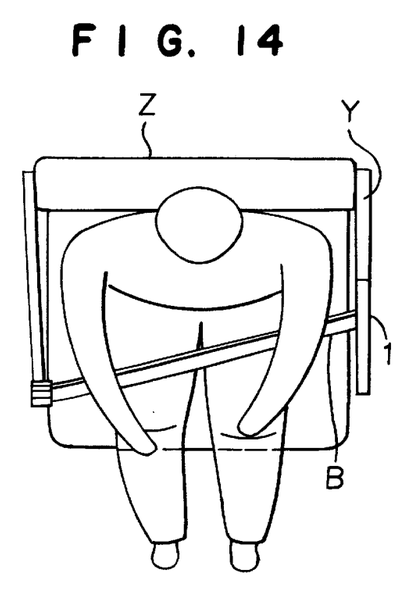
FIG. 14 is a view showing a normal state in a riding condition in an embodiment in accordance with the present invention.

The latch structure for the seat belt can employ a structure of a latch (A), a latch-receiving portion (C) and a latch detachment prevention portion (D), for example, as shown in FIGS. 9 to 11.

In this case, for example, by making a horizontal width of the latch portion (A) and an inner horizontal width of the latch-receiving portion (C) substantially equal to each other or making the horizontal width of the latch portion (A) slightly narrower and forming each of surfaces of both of the latch portion (A) and the latch-receiving portion (C) in a flat surface, a state of keeping a fixed tension state without being directly in contact with the body of the occupant corresponding to a basic structure of the present invention can be easily realized.

In this case, it is possible to adjust a degree of attaching and detaching the seat belt by adjusting a vertical width of the latch-receiving portion (C).

Further, as shown in FIG. 11, by internally bringing a latch detachment prevention portion (D) into contact with the latch-receiving portion (C), it is impossible to naturally detach without an operation of the occupant on the sake of a function of the detachment prevention portion vertically movable via a spring or the like.

In this case, an adjusting mechanism capable of adjusting right and left fixed positions in the seat body, in the seat belt portion can employ an adjusting box (T) capable of selecting plural stages of heights, for example, as shown in FIGS. 15 and 16.

The seat belt canceling mechanism can, for example, employ a mechanism of forming an engaging state between the latch portion and the latch-receiving portion by a simple magnet, being turned on during an engine rotation of the automobile and being turned off when the rotation of the engine is stopped, and this mechanism is not electrically connected to a battery.

Since the present invention is structured as mentioned above, the following effects can be obtained.

In accordance with the present invention, since the seat belt is attached with keeping a tension state without being in contact with the body of the occupant, there is no restriction such as fastening the body of the occupant, a comfortable drive environment can be provided, and in particular for an occupant having a disease in the chest and an occupant having diseases of adult people such as a hypertension, an apoplexy and the like, a pressure generated by the belt can be removed.

Further, in accordance with the present invention, since the submarine corresponding cushion is provided in the seat belt portion, it is possible to prevent a so-called submarine phenomenon that the occupant slides out from the lower area of the belt when the accident is generated.

Further, since the submarine corresponding cushion is structured such that the submarine corresponding cushion is bent upward and is positioned in the side lower portion of the body of the occupant at the normal drive time, a drive interference rate is significantly low without being in contact with the body of the occupant and it is possible to provide an environment for concentrating to a safety drive without interfering a steering wheel and drive operation requiring a quick motion at an emergency and a drive operation requiring a body quick adjusting function such as maintaining a parallel balance of the body or the like at a time of traveling on a rough road.

Further, in accordance with the present invention, since the flexible elastic material expanding so as to form a spherical shape or the like when the accident is generated or the auxiliary air bag is provided in the seat belt portion, it is possible to prevent a so-called submarine phenomenon that the occupant slides out from the lower area of the belt when the accident is generated.

Further, in accordance with the present invention, since the fixing position in the seat belt portion can be freely adjusted, it is possible to sufficiently secure the safety of the occupant without relation to the physical build of the occupant, particularly even when the occupant is a child.

Further, in accordance with the present invention, since the flexible material such as the air bag or the like is mounted to the seat belt portion in the assistant driver's seat, it is possible to reduce the gap between the occupant and the dash board portion at the normal time and it is possible to utilize the seat belt structure as the body stabilizing and restraining device, so that it is possible to sufficiently secure the comfortable drive environment of the occupant, particularly the child in the assistant driver's seat and the safety when the accident is generated.

What is claimed is:

1. An automobile seat belt structure and an assist apparatus thereof, wherein a seat belt portion is adapted for being attached in tension without being in contact with a body of an occupant, and prevention means adapted for preventing a submarine phenomenon wherein the occupant slides out when an accident occurs, is provided in the seat belt portion, wherein said prevention means is adapted to come into contact with the occupant only when the accident occurs.

2. An automobile seat belt structure and an assist apparatus thereof, wherein a seat belt portion is adapted for being attached in tension without being in contact with a body of an occupant, and means characterized in that a submarine corresponding cushion, which is connected to a horizontal supporting column portion connected to a seat body, is drawn forward in accordance with a force by which said seat belt portion is drawn forward in the vehicle due to inertia when an accident occurs, said submarine corresponding cushion is adapted for being bent to a front face of the body of the occupant around a hinge corresponding to a center line and said submarine corresponding cushion adapted to cover between an armpit and chest of said occupant as prevention means for preventing the occupant from sliding out from a lower area of the seat belt portion when said accident occurs.

3. An automobile seat belt structure and an assist apparatus thereof, wherein a seat belt portion is adapted for being attached in tension without being in contact with a body of an occupant, a cushion, simply fixed via a horizontal support column and a magnet disposed in a side portion of a seat body, is provided in one end of said seat belt portion as prevention means adapted for preventing the occupant from sliding out from a lower area of said seat belt portion when an accident occurs, and there is employed means characterized in that an attraction state of the magnet is cancelled together with a force by which said seat belt portion is drawn forward in the vehicle due to inertia when the accident occurs, wherein an angle between the horizontal support column and said cushion is changed, and said cushion is adapted for being driven from a side of an occupant's armpit toward a waist of the occupant.

4. An automobile seat belt structure and an assist apparatus thereof as claimed in any one of claims 1 to 3, wherein there is employed means characterized in that an expanded flexible material is mounted to the seat belt portion in an assistant driver's seat so as to reduce a gap between the occupant and a dash board portion at a normal time and utilize as a body stabilizing the holding device and said flexible material moves and deforms in interlocking with a motion of the belt portion so as to stabilize a head portion and a body in the case that the body moves due to an inertia or a centrifugal force when the accident is generated.

5. An automobile seat belt structure and an assist apparatus thereof as claimed in any one of claims 1 to 3, wherein in order to easily disengage the seat belt portion when the accident occurs, a belt latch portion and a latch-receiving portion, attached by an electric magnetic function, are structured such that when engine rotation is stopped due to an accident, whereby a power generating function is stopped, energizing to the electric magnet is stopped, being interlocked with the power generating function, and said electric magnetic function is automatically lost.

6. An automobile seat belt structure and an assist apparatus thereof as claimed in claim 5, wherein there is employed means characterized in that an expanded flexible material is mounted to the seat belt portion in an assistant driver's seat so as to reduce a gap between the occupant and a dash board portion at a normal time and utilize as a body stabilizing and holding device and said flexible material moves and deforms in interlocking with a motion of the belt portion so as to stabilize a head portion and a body in the case that the body moves due to an inertia or a centrifugal force when the accident is generated.

7. An automobile seat belt structure and an assist apparatus thereof as claimed in any one of claims 1 to 3, wherein fixing positions of right and left supporting columns of a seat body in the seat belt portion can be freely adjusted and said fixing position can be adjusted in correspondence to a body condition of the occupant.

8. An automobile seat belt structure and an assist apparatus thereof as claimed in claim 7, wherein in order to easily disengage the seat belt when the accident is generated, a belt latch portion and a latch-receiving portion attached by an electric magnet is structured such that an engine rotation is stopped due to an accident, whereby a power generating function is stopped, an energizing to the electric magnet is stopped in interlocking with the stop of the power generating function and said magnetic function is automatically lost.

9. An automobile seat belt structure and an assist apparatus thereof as claimed in claim 7, wherein there is employed means characterized in that an expanded flexible material is mounted to the seat belt portion in an assistant driver's seat so as to reduce a gap between the occupant and a dash board portion at a normal time and utilize as a body stabilizing and holding device and said flexible material moves and deforms in interlocking with a motion of the belt portion so as to stabilize a head portion and a body in the case that the body moves due to an inertia or a centrifugal force when the accident is generated.

* * * * *